United States Patent
Sung et al.

(10) Patent No.: US 8,451,368 B2
(45) Date of Patent: May 28, 2013

(54) IMAGING SYSTEMS AND OPTICAL SYSTEMS WITH EXTENDED DEPTH OF FOCUS

(75) Inventors: Hsin-Yueh Sung, Taipei County (TW); Chir-Weei Chang, Taoyuan County (TW)

(73) Assignee: Industrial Technology Research Institute, Hsinchu (TW)

(*) Notice: Subject to any disclaimer, the term of this patent is extended or adjusted under 35 U.S.C. 154(b) by 365 days.

(21) Appl. No.: 12/837,457

(22) Filed: Jul. 15, 2010

(65) Prior Publication Data
US 2011/0050980 A1 Mar. 3, 2011

(30) Foreign Application Priority Data
Sep. 1, 2009 (TW) .............................. 98129374 A (51) Int. Cl.
*H04N 5/225* (2006.01)
*G03B 7/00* (2006.01)

(52) U.S. Cl.
USPC .......................................... 348/340; 348/345

(58) Field of Classification Search
USPC .............. 348/345, 346, 335, 340, 222.1, 349, 348/343, 135; 359/637, 724; 250/201.1, 201.2, 250/201.9
See application file for complete search history.

(56) References Cited

U.S. PATENT DOCUMENTS

| | | | |
|---|---|---|---|
| 5,748,371 A * | 5/1998 | Cathey et al. | 359/558 |
| 6,525,302 B2 * | 2/2003 | Dowski et al. | 250/201.2 |
| 6,774,944 B1 * | 8/2004 | Fukuyama | 348/345 |
| 6,927,922 B2 | 8/2005 | George et al. | |
| 7,158,317 B2 | 1/2007 | Ben-Eliezer et al. | |
| 2002/0195538 A1 * | 12/2002 | Dowsk et al. | 250/201.2 |

* cited by examiner

*Primary Examiner* — Ngoc-Yen Vu
*Assistant Examiner* — Ahmed A Berhan (57) ABSTRACT

An optical imaging system with extended depth of focus is provided. The optical imaging system includes an optical imaging module, an array type detector and an image restoration module. The optical imaging module has a specific longitudinal spherical aberration corresponding to the depth of focus. The array type detector is coupled to the optical imaging module to obtain a image via the specific longitudinal spherical aberration provided by the optical imaging module. The image restoration module is coupled to the array type detector, wherein the array type detector converts the obtained image to a digitalized image and the image restoration module receives the digitalized image and performs an image restoration operation to the digitalized image to form an image with extended depth of focus.

15 Claims, 13 Drawing Sheets

| Surface Number | Curvature Radius (mm) | Thickness (mm) | Refraction Index |
|---|---|---|---|
| 1 | 128.40 | 5.64 | 3.426 |
| 2 | 224.13 | 24.00 | 1.000 |
| 3 | -290.02 | 2.54 | 4.024 |
| 4 | -908.91 | 35.00 | 1.000 |
| 5 | 203.28 | 3.86 | 3.426 |
| 6(AS) | 1809.90 | 39.04 | 1.000 |
| 7(Stop) | INF | 26.08 | 1.000 |
| IMG | INF | 0.00 | |

| Even Aspheric Surface 6 | Curvature Radius (mm) |
|---|---|
| K | 1.9066E3 |
| AD | 4.3065E-8 |
| AE | -5.4747E-11 |
| AF | 2.4156E-16 |

$$Z(r) = \frac{cr^2}{1+\sqrt{1-(1+k)c^2 r^2}} + ADr^4 + AEr^6 + AFr^8$$

IMAGING SYSTEMS AND OPTICAL SYSTEMS WITH EXTENDED DEPTH OF FOCUS

CROSS REFERENCE TO RELATED APPLICATIONS

This application claims priority of Taiwan Patent Application No. 098129374, filed on Sep. 1, 2009, the entirety of which is incorporated by reference herein.

TECHNICAL FIELD

The invention relates to optical imaging systems and optical systems with extended depth of focus.

DESCRIPTION OF THE RELATED ART

Digital optical imaging systems have been widely used in various electronic devices, such as digital cameras and smart phones, to form images. In addition, some digital optical imaging systems may also be required to provide extended depth of focus. Qualities of images generated by conventional digital optical imaging systems may be required to be good and clear enough. However, it is a trade-off about achieving clearly enough of image quality and large depth of focus with reduced fabrication tolerance. Therefore, disclosures have been made, wherein extended depth of focus has been improved.

For extended depth of focus, conventional digital optical imaging systems utilize phase masks with special designs. In U.S. publication, no. 5748371, Dowski utilizes mathematical models, such as the Stationary Phase method and Radar Ambiguity function to design a cubic phase mask for a digital optical imaging system with extended depth of focus effect. The cubic phase mask forms a point spread function within a specific range. The images obtained through the cubic phase mask may be referred as a blurred image. A restoration filter is required to restore the blurred image to an original image. However, because a free-form surface phase mask is required, costs are high and mass production is not feasible. Specifically, it is difficult to form the free-form surface phase mask. Meanwhile, an additional cost of an optical detector may be required, due to the poor ability to against noise for such a point spread function.

Thus, in summary, conventional digital optical imaging systems having extended depth of focus suffer from the following drawbacks. First, costs are normally higher due to the additional masks or aspheric lenses required for fabrication. Secondly, integration of additional masks or free-from aspheric lenses further complicates the design and fabrication process. And lastly, the image restoration process is made more complex with the asymmetric and larger point spread function.

SUMMARY

An embodiment of an optical imaging system with extended depth of focus comprises an optical imaging module, an array type detector and an image restoration module. The optical imaging module has a specific longitudinal spherical aberration corresponding to the depth of focus, wherein the specific longitudinal spherical aberration is characterized by the wave-front aberration equation;

$$W(\rho) = \sum_{n=4,6,8,\ldots} \left(\frac{\Delta z}{4n(F\#)^2}\right)\left(-\frac{\Delta z}{f_0}\right)^{\frac{n-4}{2}} \rho^n$$

where, $W(\rho)$ is the wave-front aberration, $\rho$ is normalized pupil radius, $f_0$ is paraxial focal length, $\Delta z$ is desired depth of focus, $F\#$ is F Number, n is the order of spherical wave-front aberration, n=4 is 3rd order spherical aberration, n=6 is 5th order spherical aberration and so on. The array type detector is coupled to the optical imaging module for obtaining an image via the specific longitudinal spherical aberration provided by the optical imaging module. The image restoration module is coupled to the array type detector, wherein the array type detector converts the obtained image to a digitalized image and the image restoration module receives the digitalized image and performs an image restoration operation to the digitalized image to form an image with depth of focus.

Another embodiment of an optical system with extended depth of focus, comprises an optical imaging module. The optical image module has a specific longitudinal spherical aberration corresponding to the depth of focus for generating an image, wherein the specific longitudinal spherical aberration is characterized by the wave-front aberration equation:

$$W(\rho) = \sum_{n=4,6,8,\ldots} \left(\frac{\Delta z}{4n(F\#)^2}\right)\left(-\frac{\Delta z}{f_0}\right)^{\frac{n-4}{2}} \rho^n,$$

where $W(\rho)$ is the wave-front aberration, $\rho$ is normalized pupil radius, $f_0$ is paraxial focal length, $\Delta z$ is desired depth of focus, $F\#$ is F Number, n is the order of spherical wave-front aberration, n=4 is 3rd order spherical aberration, n=6 is 5th order spherical aberration and so on.

BRIEF DESCRIPTION OF THE DRAWINGS

The invention can be more fully understood by reading the subsequent detailed description and examples with reference to the accompanying drawings, wherein.

DESCRIPTION OF THE EMBODIMENTS

Reference will now be made in detail to the present embodiments of the disclosure, examples of which are illustrated in the accompanying drawings. This following description is made for the purpose of illustrating the general principles of the invention and should not be taken in a limiting sense. The scope of the invention is best determined by reference to the appended claims.

Figure 1:
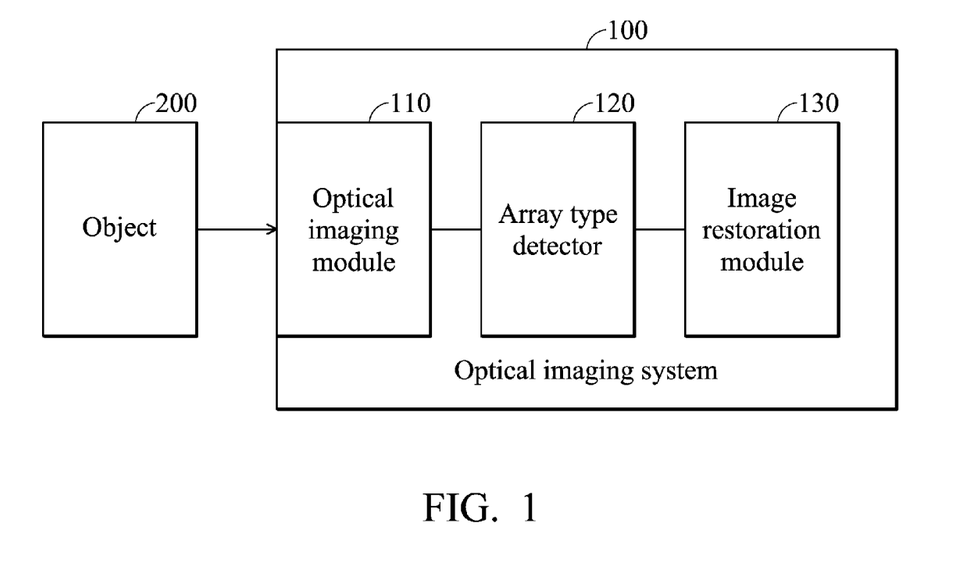
FIG. 1 shows a block diagram of an embodiment of an optical imaging system with extended depth of focus according to the invention.

FIG. 1 shows a block diagram of an embodiment of an optical imaging system 100 with extended depth of focus for providing an image with a depth of focus. As shown in FIG. 1, the optical imaging system 100 comprises an optical imaging module 110, an array type detector 120 and an image restoration module 130. The optical imaging system 100 has a specific depth of focus, wherein the depth of focus represents the focal range of clear image quality. In other words, a range of the resulting image in which the resulting image is clear beyond the focal point. Thus, the longer the depth of focus is, the larger the distance range of clear image is. The optical imaging module 110 has a specific longitudinal spherical aberration corresponding to the depth of focus supported by the optical imaging system 100 for capturing a light image of an object 200 focused by the optical imaging system 100. The specific longitudinal spherical aberration causes the captured light image to form an image. It is to be understood that, in some embodiment, the optical imaging module 110 with the specific longitudinal spherical aberration may have a feature of extended depth of focus and thus the optical imaging system 100 may comprise at least the optical imaging module 110 and an array type detector 120 to form an optical imaging system with the extended depth of focus. The specific longitudinal spherical aberration is characterized by the wave-front aberration equation:

$$W(\rho) = \sum_{n=4,6,8,\ldots} \left(\frac{\Delta z}{4n(F\#)^2}\right)\left(-\frac{\Delta z}{f_0}\right)^{\frac{n-4}{2}} \rho^n$$

where $\rho$ represents the normalized exit pupil radius from 0 to 1, $\Delta z$ represents the maximum longitudinal focus shift (i.e. depth of focus), $f_0$ represents the paraxial focal length, and n represents order of spherical wave-front aberration, e.g. n=4 is $3^{rd}$ order spherical aberration ($W_{040}$), n=6 is $5^{th}$ order spherical aberration ($W_{060}$) and so on, and F# represents the F-number and is defined by $$F\# = \frac{f_0}{2r_{max}}$$

where $r_{max}$ represents the maximum exit pupil radius.

Generally Speaking, spherical aberration causes a circular image blur which is the same over the entire field of view. It is the only monochromatic aberration which occurs on the optical axis. It results form the rays through different zones of the aperture being focused at different distances from the lens. Spherical aberration is therefore of the form $\rho^4$, $\rho^6$, $\rho^8$, $\rho^{10}$ ... as a wave-front aberration, wherein $\rho$ is the normalized exit pupil radius. On the optical axis, when spherical aberration is not present, the wave-front is a spherical wave. Of course, the spherical wave will converge at a single point in the image space. In this case, the system is referred to as a "no aberration" system. However, in actual conditions, the wave-front from the exit pupil may not converge at a single point in the image space. Such a system is referred to as an "aberration" system.

The specific longitudinal spherical aberration of the optical imaging module 110 may be formed by the optical imaging module 110 or by different external components. For example, the specific longitudinal spherical aberration of the optical imaging module 110 may be made by a phase mask, a standard axis symmetric aspheric lens, a diffraction optical component, a gradient index component and even an optical system formed by a whole spherical lens, but it is not limited thereto. In one embodiment, the optical imaging module 110 is an optical system with a standard axis symmetric aspheric lens and a required specific longitudinal spherical aberration may be generated by suitably adjusting surface data of the aspheric lens. The purpose of adjusting the specific longitudinal spherical aberration is to convert the captured light image into a specific blurred image. Here, the specific blurred image is defined as an image wherein the energy distribution of the point spread function (PSF) corresponding to the optical imaging system 100 within the assigned depth of focus range is more uniform than that of a diffraction limit-based optical imaging system. The energy distribution of the point spread function (PSF) is detailed in the following.

Generally, a value of the specific longitudinal spherical aberration of the optical imaging module 110 may be adjusted according to the depth of focus requirement for the optical imaging system 100. In one embodiment, the optical imaging module 110 further obtains a specific range of the specific longitudinal spherical aberration according to the depth of focus requirement for the optical imaging system 100 and selects a specific longitudinal spherical aberration within the specific range. For example, under a specific depth of focus requirement, the specific longitudinal spherical aberration may be designed within a specific range, such as a range between 0.25λ and 2.85λ such that the spatial frequency $v_{cutoff} \geq \frac{2}{3} v_0$, wherein λ represents the wavelength of light. In one embodiment, the specific longitudinal spherical aberration may be defined as 2.35λ, where $v_0$ represents a cut-off spatial frequency under the diffraction limited and $v_{cutoff}$ represents the cut-off spatial frequency for a given specific longitudinal spherical aberration between 0.25λ and 2.85λ. In general, the lower the cut-off spatial frequency, the larger the specific longitudinal spherical aberration for extending the depth of focus. Therefore, in an embodiment that applies a low resolution optical imaging system, the specific longitudinal spherical aberration of the optical imaging module of the low resolution optical imaging systems can be 5λ.

In another embodiment, when the specific longitudinal spherical aberration of the optical imaging module 110 is defined within the specific range, the specific longitudinal spherical aberration causes the energy distribution of the point spread function corresponding to the optical imaging system 100 along the optical axis (z) to be more uniform than that of a diffraction limit-based optical imaging system and a Strehl ratio for the optical imaging system 100 exceeds a specific value (e.g. 0.2).

Figure 2A:
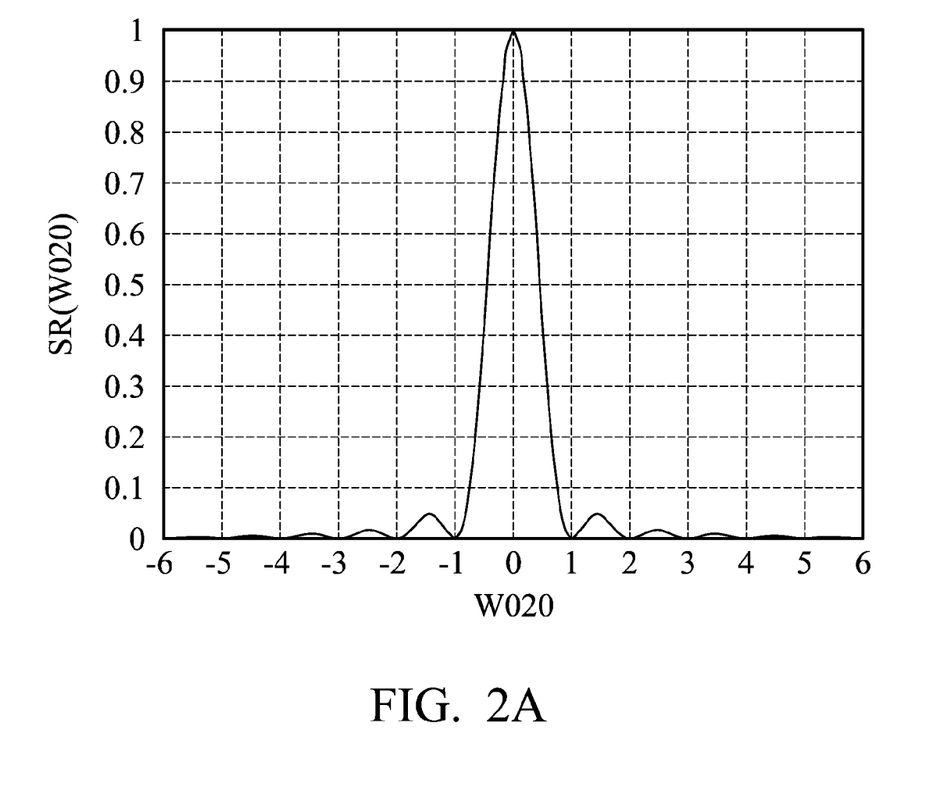
FIGS. 2A and 2B are schematic diagrams illustrating variation for the number of defocus W020 and the Strehl ratio SR respectively according to the invention.
Figure 2B:
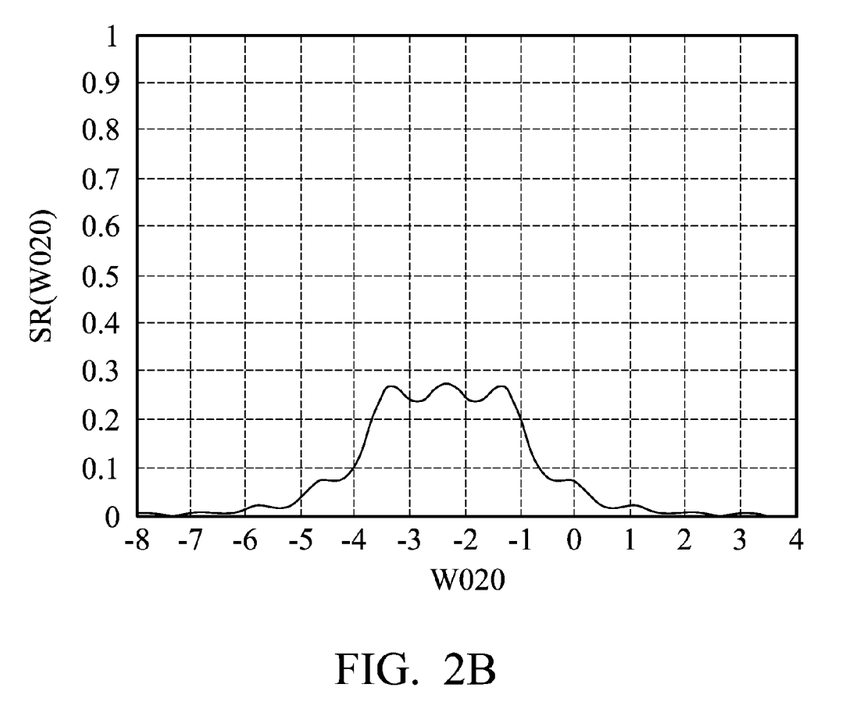

For example, please refer to FIGS. 2A and 2B, which are schematic diagrams illustrating variations for the number of defocus W020 and the Strehl ratio SR respectively, wherein the horizontal axis represents the number of defocus W020 while the vertical axis represents the Strehl ratio SR. The number of defocus W020 indicates the defocus degree of divergence from the focal point and the Strehl ratio SR is a ratio the peak intensity of an actual point spread function to the peak intensity of diffraction limit-based point spread function. FIG. 2A shows a variation of the Strehl ratio SR with different value of defocus W020 for an optical imaging system with a conventional diffraction limit-based design. FIG. 2B shows a variation of the Strehl ratio SR with different value of defocus W020 for an embodiment of an optical imaging system having a specific longitudinal spherical aberration (e.g. 2.35λ) of the invention.

As shown in FIG. 2A, according to the Rayleigh Criteria, for an optical imaging system with a conventional diffraction limit-based design, energy distribution of a point spread function thereof become more uniformly distributed in a defocus range of about ±0.25λ.

However, as shown in FIG. 2B, if the specific longitudinal spherical aberration is set to a predetermined value (e.g. 2.35λ), energy distribution of a point spread function thereof may be uniformly distributed in a defocus range of about ±1.5λ, with a Strehl ratio maintained within a range between 0.2 and 0.3. Comparing FIG. 2A with FIG. 2B, it is known that when the specific longitudinal spherical aberration is defined within the specific range, the specific longitudinal spherical aberration (e.g. 2.35λ) may cause the energy distribution of the point spread function corresponding to the optical imaging system 100 along the optical axis (z) to be more uniform than that of a diffraction limit-based optical imaging system and a Strehl ratio for the optical imaging system 100 may be maintained to exceed a specific value.

In some embodiments, the optical imaging module 110 may comprise major $3^{rd}$ order longitudinal spherical aberration and ignore the high order term. The optical imaging module 110 causes a value of the high order spherical aberration to be much smaller than that of the specific 3rd order spherical aberration. For example, in one embodiment, the optical imaging module 110 may define the 3rd order spherical aberration W040 as 2.45λ and define the high order spherical aberration W060 as a value that is lower than ±0.3λ. In this case, the value of the high order spherical aberration W060 is about 15 percent (=0.3/2.35) of that of the 3rd order spherical aberration W040.

The array type detector 120 is coupled to the optical imaging module 110 to perform light and electronic transformation to convert a light image captured by the optical imaging module 110 to a digitalized image for subsequent image processing. In one embodiment, the array type detector 120 may be a charge-coupled device (CCD) detection component or a complementary metal oxide semiconductor (CMOS) detection component, but it is not limited thereto. Operation and methods to use the array type detector 120 are well known for persons skilled in the art and thus detailed descriptions are omitted here for brevity.

In some embodiments, the image restoration module 130 is coupled to the array type detector 120, and the image restoration module 130 receives the digitalized image generated by the array type detector 120 and performs an image restoration operation with a restoration algorithm to the digitalized image to form a clearer image with depth of focus. The image restoration module 130 may comprise any commonly used filters (e.g. inverse filter, Wiener filter and minimum mean square error (MMSE) filter), such as filters that utilize a linear or non-linear method as its restoration algorithm, for performing an image restoration operation to the digitalized image generated by the array type detector 120 such that the digitalized image becomes clearer. For example, in one embodiment, the image restoration module 130 may be an image restoration device with a minimum mean square error (MMSE) filter for restoring the image, wherein for the MMSE filter with noise conditions, its filter form may be represented as the following equation:

$$\hat{F}(\mu, v) = \left[\frac{H*(\mu, v)}{|H(\mu, v)|^2 + 1/SNR(\mu, v)}\right] G(\mu, v),$$

where u,v represent spatial frequencies, F (u,v) represents a clear image after the image restoration operation has been performed, H (u,v) represents an optical transfer function (OTF) for the optical system and SNR (u,v) represents the signal to noise ratio of the opto-electronic system. The optical transfer function for the optical system corresponds to the specific longitudinal spherical aberration calculated.

Descriptions regarding extension of the depth of focus are detailed in the following.

Figure 3:
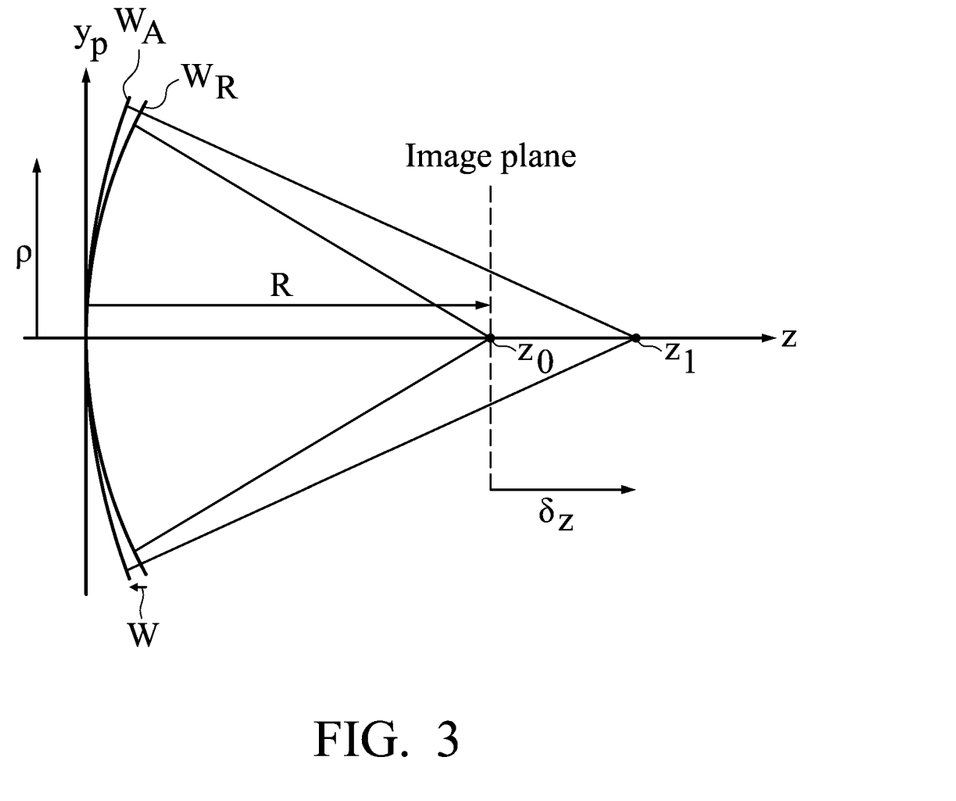
FIG. 3 is a schematic diagram illustrating an example of wavefront aberrations.

Please refer to FIG. 3, which illustrates a schematic diagram showing an example of the specific longitudinal spherical aberrations.

According to Geometrical Optics, when the wave-front is a spherical wave, the ideal wave-front $W_R$ may be focused on a single point, which is referred to as the focus point $Z_0$, i.e. paraxial focal length $f_0$. The wave-front in this invention, however, will not be focused on a single point, e.g. the wave-front may focus at point $Z_0$ at normalized exit pupil radius $\rho=0$ and focus at point $Z_1$ at normalized exit pupil radius $\rho=1$ when aberrations have been introduced such that the actual wave-front $W_A$ may form a specific longitudinal spherical aberration or so-called the depth of focus along the optical axis z as shown in FIG. 3.

Next, an axial irradiance equalization on paraxial condition along the z axis will be considered. It is assumed that the aforementioned axial irradiance is uniformly distributed from paraxial focal length $f_0$ to $f_0+\Delta z$, where $\Delta z$ represents desired depth of focus. The following differential equation may be obtained under the condition of equally axial irradiance on paraxial condition:

$$\left(\frac{L_0}{f_0}\right) 2\pi r dr = \varepsilon_0 df, \qquad (2)$$

where $L_0$ represents the radiance, for exit pupil is lambertian, $L_0$ is the constant. r represents the exit pupil radius, $f_0$ represents the paraxial focal length, f(r) represents a focal length under different exit pupil radius and $\epsilon_0$ represents irradiance per unit length and it is constant.

By Solving the differential equation (2), the solution of f(r) can be obtained:

$$f(r) = f_0 + \left(\frac{\Delta z}{r_{max}^2}\right) r^2, \qquad (3)$$

where $r_{max}$ represents the maximum pupil radius and $\Delta z$ represents the maximum longitudinal focus shift at $r=r_{max}$ (i.e. depth of focus).

From Equation (3), the wave-front phase $\phi_{aber}(\rho)$ can further be obtained:

$$\phi_{aber}(\rho) = \frac{r_{max}^2}{2f_0} + \sum_{n=4,6,8,\ldots} \left(\frac{\Delta z}{4n(F\#)^2}\right)\left(-\frac{\Delta z}{f_0}\right)^{\frac{n-4}{2}} \rho^n, \qquad (4)$$

where $$\rho = \frac{r}{r_{max}}$$

represents the normalized exit pupil radius from 0 to 1, $\Delta z$ represents the maximum longitudinal focus shift at $\rho=1$ (i.e. depth of focus), $f_0$ represents the paraxial focal length, and n represents the order of spherical wave-front aberration. n=4 is $3^{rd}$ order spherical aberration (W040), n=6 is $5^{th}$ order spherical aberration (W060) and so on.

Therefore, a phase difference of the wave-front phase and the spherical wave under the paraxial condition $W(\rho)$ is listed as below:

$$W(\rho) = \sum_{n=4,6,8,\ldots} \left(\frac{\Delta z}{4n(F\#)^2}\right)\left(-\frac{\Delta z}{f_0}\right)^{\frac{n-4}{2}} \rho^n. \quad (5)$$

where $$\rho = \frac{r}{r_{max}}$$

represents the normalized exit pupil radius from 0 to 1, $\Delta z$ represents the maximum longitudinal focus shift at $\rho=1$ (i.e. desired depth of focus), $f_0$ represents the paraxial focal length, n represents the order of spherical wave-front aberration and F# represents F-Number $$\left(F\# = \frac{f_0}{2r_{max}}\right)$$

Therefore, Equation (5) shows that depth of focus may be extended by suitably designing the range for the specific multi-order longitudinal spherical aberration.

As aforementioned, the optical imaging module 110 may comprise major $3^{rd}$ order longitudinal spherical aberration and ignore the high order term. The optical imaging module 110 causes a value of the high order spherical aberration to be much smaller than that of the specific 3rd order spherical aberration.

Descriptions regarding extension of the depth of focus are detailed in the following.

According to Geometrical Optics, when the wavefront is a spherical wave, the ideal wavefront $W_R$ may be focused on a single point, which is referred to as the focus point $Z_0$. The wavefront, however, will not be focused on a single point, e.g. the wavefront may focus at point $Z_1$ when aberrations have been introduced such that the actual wavefront $W_A$ may form a longitudinal spherical aberration or so-called the depth of focus along the optical axis z as shown in FIG. 3.

Next, an equal energy aberration distributed along the z axis will be considered. It is assumed that the aforementioned longitudinal spherical aberration is uniformly divided into N portions, wherein n represent the $n^{th}$ portion. The following equation may be obtained under conditions of equal longitudinal focus shift:

$$\frac{\delta z_n}{\delta z_{max}} = \frac{n}{N}. \quad (1)'$$

Further, energy in the pupil is proportional to the area formed in the pupil due to the exit pupil being uniformly illuminated under conditions of native illumination and paraxial approximation. Therefore, equal energy distribution is equal to equal area distribution. Under equal area partition conditions, the following equation can be obtained:

$$\frac{\rho_n^2}{\rho_{max}^2} = \frac{n}{N}. \quad (2)'$$

Using Equations (1)' and (2)', the following result may be obtained:

$$\delta z = k \times \rho^2 \quad (3)',$$

where k is a constant.

Furthermore, a conventional 3rd order spherical aberration equation is listed as follows:

$$\delta z = -16(F/\#)^2 W_{040} \times \rho^2 \quad (4)',$$

where $\rho$ represents the aperture height, $\delta z$ represents longitudinal focus shift (depth of focus), W040 represents the $3^{rd}$ order spherical aberration and F/# represents the F-number which is a coefficient relating to the maximum aperture height and curvature radius R of the spherical wave formed while the actual wavefront $W_A$ and the ideal wavefront $W_R$ are intersected.

Therefore, Equations (3)' and (4)' show that depth of focus may be extended by suitably designing the range for the 3rd order spherical aberration.

In another embodiment, an optical system with extended depth of focus of the invention is further provided.

Figure 4:
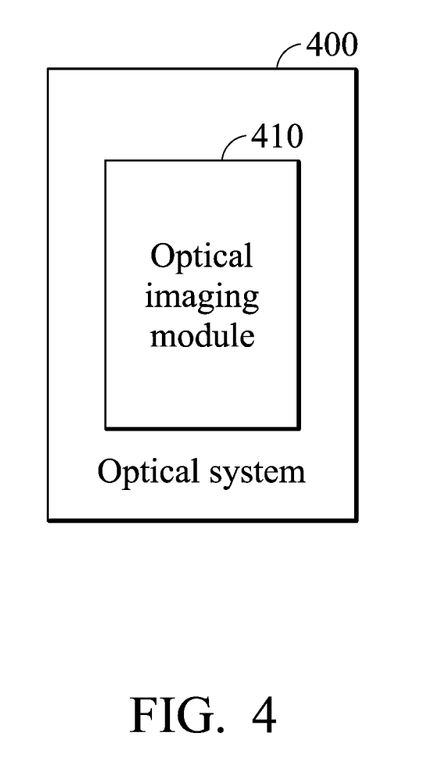
FIG. 4 shows a block diagram of an embodiment of an optical system according to the invention.

FIG. 4 shows a block diagram of an embodiment of an optical system 400 according to the invention. As shown in FIG. 4, the optical system 400 comprises an optical imaging module 410, wherein the optical imaging module 410 has a specific longitudinal spherical aberration corresponding to the depth of focus for generating a more uniformly blurred image that is based on the Equation (5). It is to be noted that the optical imaging module 410 shown in FIG. 4 is similar to the optical imaging module 110 shown in FIG. 1, and thus detailed description is omitted. Similarly, in one embodiment, the optical imaging module 410 further obtains a specific range of the specific longitudinal spherical aberration (e.g. a range between 0.25λ and 2.85λ) according to the depth of focus and generate the more uniformly blurred image that is based on the specific longitudinal spherical aberration. In another embodiment, when the specific longitudinal spherical aberration is defined within the specific range, the specific longitudinal spherical aberration may cause the energy distribution of the point spread function corresponding to the optical system in the optical axis (z) to be more uniform than that of a diffraction limit-based optical imaging system and a Strehl ratio for the optical system may exceed a specific value (e.g. 0.2). In general, the lower the cut-off spatial frequency, the larger the specific longitudinal spherical aberration for extending the depth of focus. For low resolution optical imaging systems, the wave-front aberration of the specific longitudinal spherical aberration is even 5λ. In another embodiment, the optical imaging module 410 may further have major 3rd order spherical aberrations and the other high order terms are far less than $3^{rd}$ order term so that the optical imaging module 410 causes a value of the high order spherical aberration to be much smaller than that of the specific 3rd order spherical aberration. For example, in one embodiment, the optical imaging module 110 may define the 3rd order spherical aberration W040 as 2.45λ and define the high order spherical aberration W060 as a value that is lower than ±0.3λ. In this case, the value of the high order spherical aberration W060 is about 15 percent (=0.3/2.35) of that of the 3rd order spherical aberration W040.

The specific longitudinal spherical aberration of the optical imaging module 410 may be made formed by different external components. For example, the specific longitudinal spherical aberration of the optical imaging module 410 may be made by a phase mask, a standard axis symmetric aspheric lens, a diffraction optical component and a gradient index component, but it is not limited thereto. In one embodiment, the optical system 400 may be an optical system with a whole-spherical lens and a required specific longitudinal spherical aberration may be generated by suitably adjusting surface data of the whole-spherical lens. The purpose of adjusting the specific longitudinal spherical aberration is for converting the captured light image to become a uniformly blurred image.

Therefore, according to the digital optical imaging system with extended depth of focus capability of the invention, the depth of focus can be efficiently extended by using the aberration features for the optical system (i.e. the specific longitudinal spherical aberrations) such that it may be easily integrated into a system without additional phase masks. Moreover, the optical system with a rotational symmetric aspheric lens below $8^{th}$ order or a whole-spherical lens may be utilized. Note that manufacturing of the rotational symmetric aspheric lens or whole-spherical lens is not difficult and costs are relatively inexpensive. Moreover, as the point spread function formed by the aforementioned method is symmetric, image restoration is easier than conventional methods. Also, as the formed point spread function has a smaller size, the method of the invention may be applied to large noise conditions.

Following are embodiments for further illustrating how an optical system with extended depth of focus capability is configured according to the invention, but the invention is not limited thereto.

Figure 5:
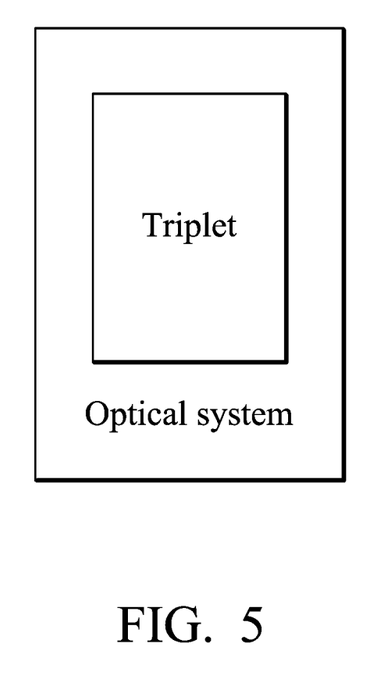
FIG. 5 shows a block diagram of another embodiment of an optical system according to the invention.

FIG. 5 shows a block diagram of another embodiment of an optical system. In this embodiment, a triplet imaging system is used to configure the optical system with the extended depth of focus. The lens system parameters of the optical system of the embodiment are listed in Table 1:

TABLE 1

| Focal Length | F number (F/#) | Field of view (FOV) | Object Distance | Magnification |
|---|---|---|---|---|
| 100 mm | 2 | 2 degree | Infinity | 0 | wherein focus length is 100 mm, F number is 2, object distance is at infinity, field of view (FOV) is 2 degree and magnification is 0.

Figure 6A:
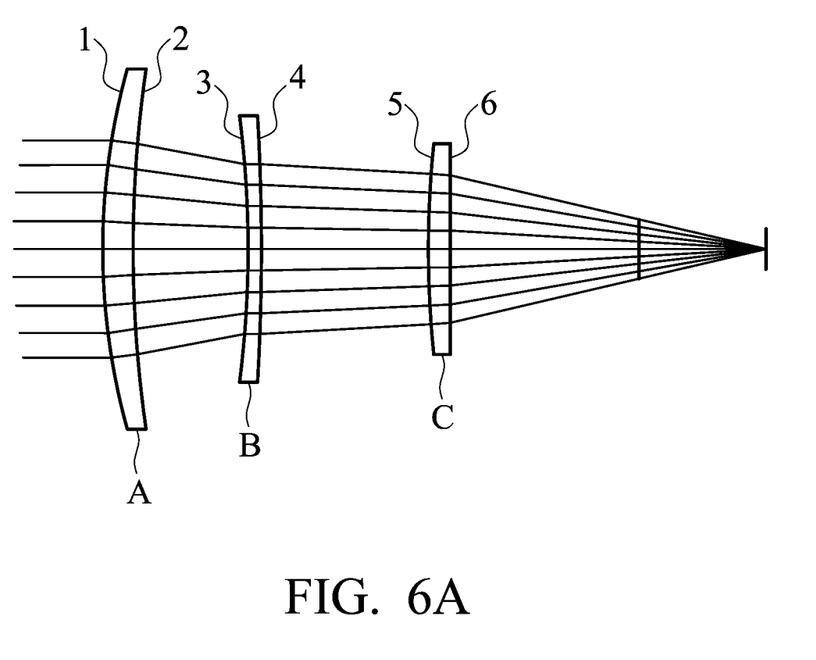
FIG. 6A shows an embodiment of a triplet lens layout according to the invention.

FIG. 6A shows an embodiment of a triplet lens layout according to the invention. As shown in FIG. 6A, the optical system consists of three lens A, B and C, wherein lens A has surfaces 1 and 2, lens B has surfaces 3 and 4 and lens C has surfaces 5 and 6 in which surfaces 1-5 are all spherical surface while surface 6 is an aspherical surface.

Thereafter, according to the optical system design method of the invention, spherical aberration corresponding to the surface 6 is set under a specific depth of focus requirement.

Figure 6B:
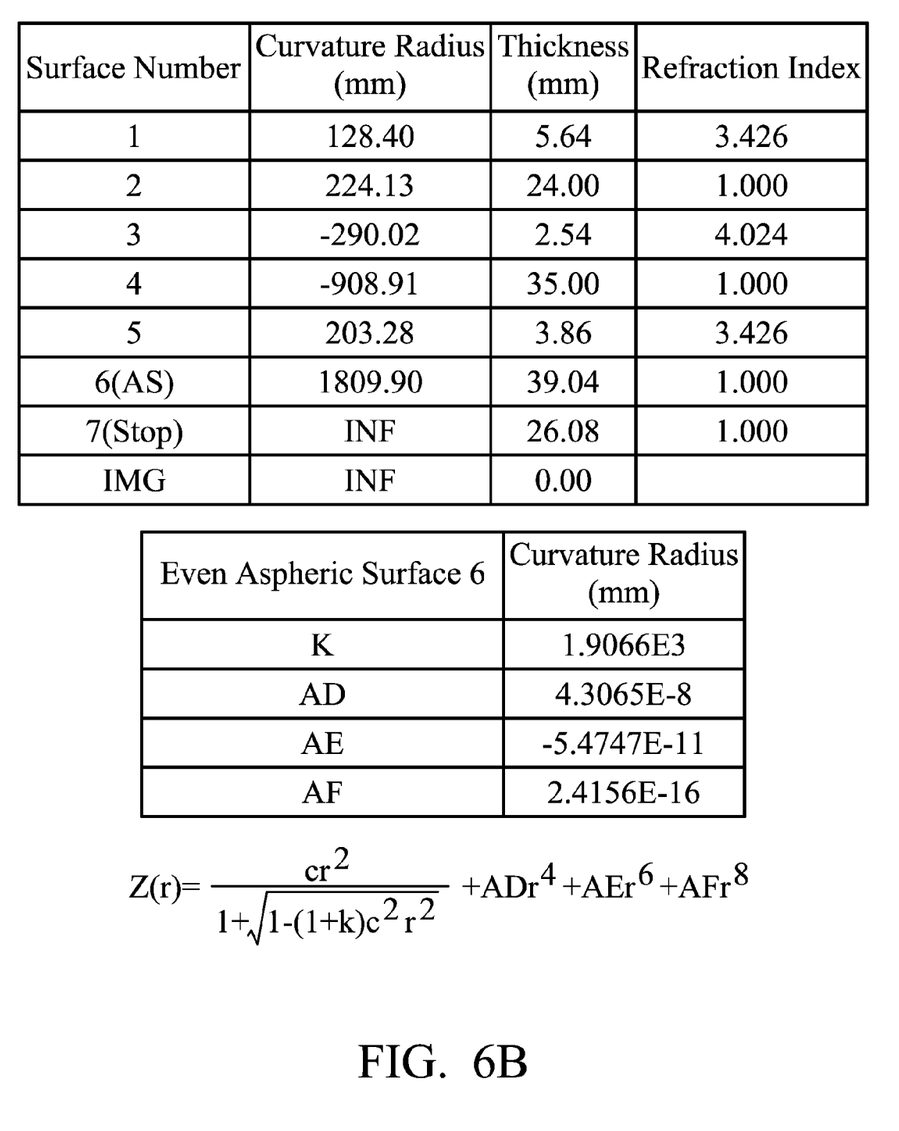
FIG. 6B is a schematic illustrating an embodiment of a lens prescription of the optical system according to the invention.

FIG. 6B is a schematic illustrating an embodiment of a lens prescription data of the optical system according to the invention, wherein Z(r) represents the aspherical surface formula, z represents the Sag thickness, r represents the aperture height, c represents the curvature, k represents the conic constant and AD, AE and AF represent even order aspheric coefficients. In this embodiment, the 3rd spherical aberration, the 5th spherical aberration and the 7th spherical aberration are 2.458λ, 0.105λ and 0.0109λ, respectively.

Figure 7A:
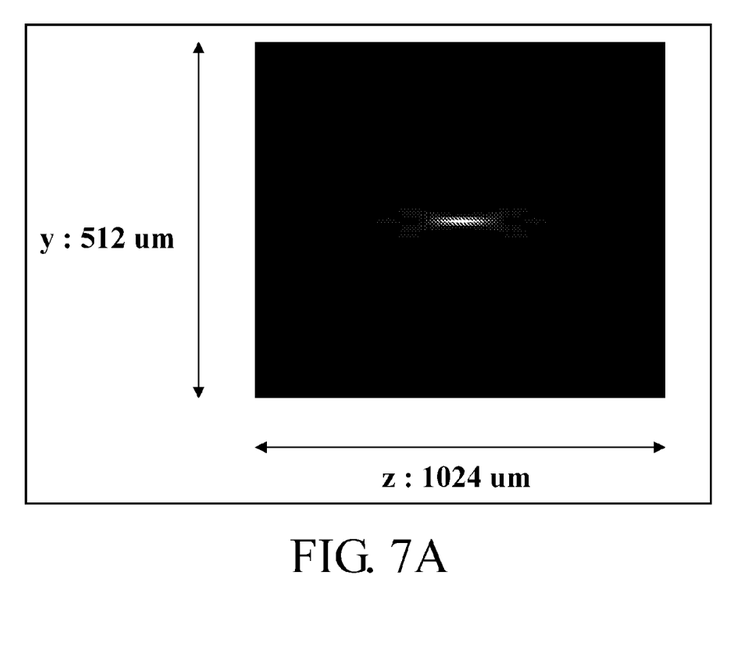
FIGS. 7A and 7B are schematics illustrating energy distributions in the optical axis z for the point spread function PSF (y,z) according to embodiments of the invention.
Figure 7B:
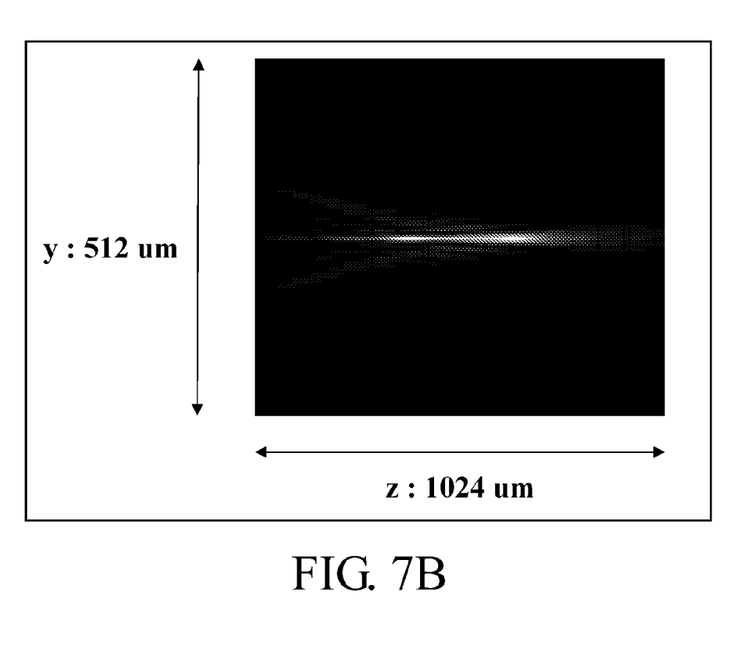

Referring to FIGS. 7A and 7B, which are schematics illustrating energy distributions in the optical axis z for the point spread function PSF (y,z) according to an embodiment of the invention, wherein the horizontal axis direction represents the optical axis z while the vertical axis direction represents value y of the point spread function. FIG. 7A is a schematic illustrating energy distributions in the optical axis z for the point spread function PSF (y) in a diffraction limit-based optical (imaging) system. FIG. 7B is a schematic illustrating energy distributions in the optical axis z for the point spread function PSF (y) in an embodiment of the optical imaging system with a specific longitudinal spherical aberration according to the invention.

Comparing FIG. 7A with FIG. 7B, the white portion distributed in FIG. 7A is more uniform, longer and thinner than that distributed in FIG. 7B. The results indicate that the energy distribution in the optical axis z for the point spread function PSF (y) in the embodiment of the optical imaging system of the invention is more uniform. In other words, an embodiment of the optical imaging system with a specific longitudinal spherical aberration according to the invention can result in a point spread function, wherein energy is uniformly distributed along the optical axis.

Figure 8A:
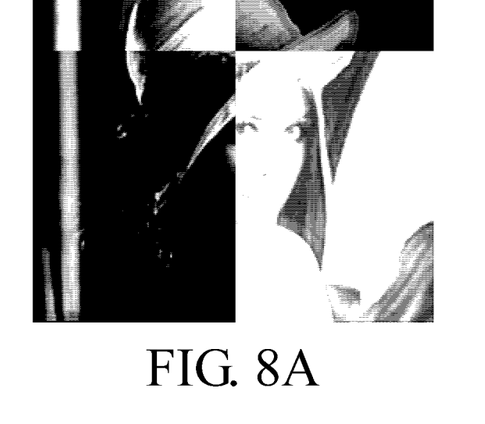
FIGS. 8A, 8B and 8C are schematics showing embodiments of images obtained at image plane of 0.0 mm, 0.2 mm and −0.2 mm relative to the best focal plane respectively when the CCD pixel size is set to 2 um.
Figure 8B:
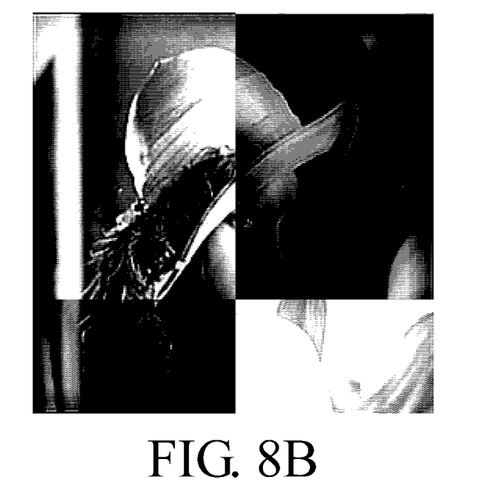
Figure 8C:
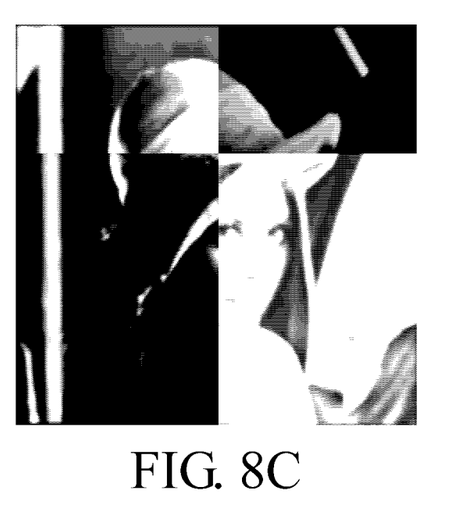
Figure 9A:
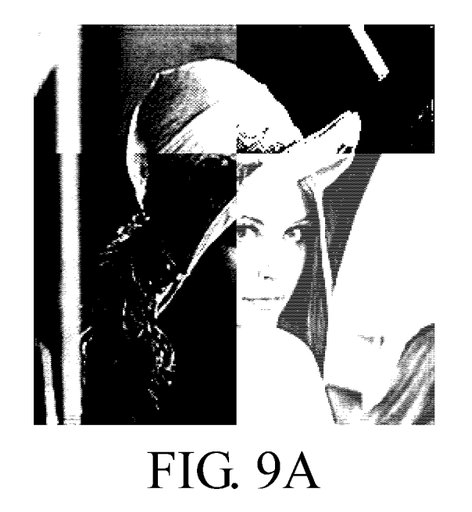
FIGS. 9A, 9B and 9C are schematics showing embodiments of restored images corresponding to images in FIGS. 8A, 8B and 8C respectively.
Figure 9B:
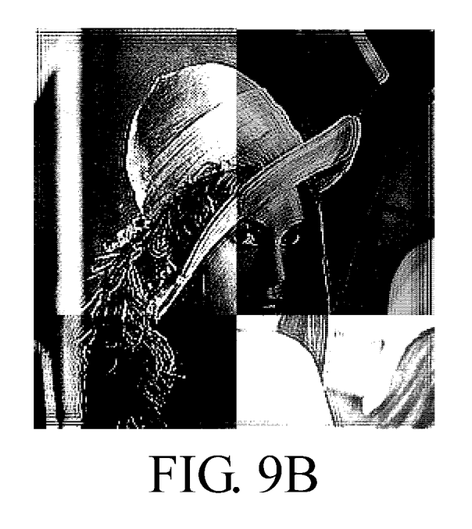
Figure 9C:
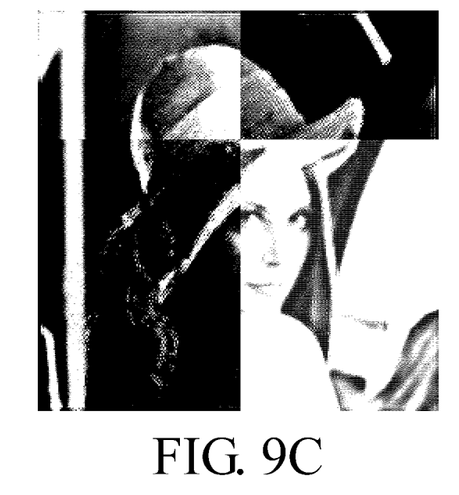

FIGS. 8A, 8B and 8C are schematics showing embodiments of images obtained at the image plane of 0.0 mm, 0.2 mm and −0.2 mm relative to the best focal plane respectively when the pixel size of the array type sensor (e.g. CCD image sensor and CMOS image sensor) is set to 2 um, while FIGS. 9A, 9B and 9C are schematics showing embodiments of restored images corresponding to images in FIGS. 8A, 8B and 8C respectively. When comparing the figures, it is shown that the restored image is clearer than the un-restored image.

Certain terms are used throughout the description and claims to refer to particular system components. As one skilled in the art will appreciate, consumer electronic equipment manufacturers may refer to a component by different names. This document does not intend to distinguish between components that differ in name but not function.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:
1. An optical imaging system with extended depth of focus for providing an image with a depth of focus, comprising:
an optical imaging module, having a specific longitudinal spherical aberration corresponding to a depth of focus, wherein the specific longitudinal spherical aberration is characterized by a wave-front aberration equation;

$$W(\rho) = \sum_{n=4,6,8,\ldots} \left(\frac{\Delta z}{4n(F\#)^2}\right)\left(-\frac{\Delta z}{f_0}\right)^{\frac{n-4}{2}} \rho^n$$

where, W(ρ) is the wave-front aberration, ρ is normalized pupil radius, $f_0$ is paraxial focal length, ΔZ is desired depth of focus, F# is F Number, n is the order of spherical wave-front aberration, n=4 is $3^{rd}$ order spherical aberration, n=6 is $5^{th}$ order spherical aberration and so on;

an array type detector coupled to the optical imaging module for obtaining an image via the specific longitudinal spherical aberration provided by the optical imaging module; and an image restoration module coupled to the array type detector, wherein the array type detector converts the obtained image to a digitalized image and the image restoration module receives the digitalized image and performs an image restoration operation to the digitalized image to form an image with depth of focus.

2. The optical imaging system of claim 1, wherein the specific longitudinal spherical aberration causes the energy distribution of the point spread function corresponding to the optical imaging system along the optical axis (z) to be more uniform than that of a diffraction limit-based optical imaging system and a Strehl ratio for the optical imaging system to exceed a specific value.

3. The optical imaging system of claim 2, wherein a specific range of the specific longitudinal spherical aberration is between 0.25λ and 5λ.

4. The optical imaging system of claim 2, wherein the energy distribution of the point spread function corresponding to the obtained image essentially has a defocus range of ±1.5λ and the Strehl ratio is in a range between 0.2 and 0.3.

5. The optical imaging system of claim 1, wherein the specific longitudinal spherical aberration of the optical imaging module comprises major $3^{rd}$ order longitudinal spherical aberration.

6. The optical imaging system of claim 5, wherein the values of high order spherical aberrations higher than the 3rd order spherical aberration are less than about 15 percent of that of the 3rd order spherical aberration.

7. An optical system with extended depth of focus, comprising:

an optical imaging module having a wave-front modulation means, wherein the wave-front modulation means causes an energy of a point spread function of the optical imaging module along an optical axis to be substantially uniformly distributed, wherein the wave-front modulation means further has a specific longitudinal spherical aberration and the specific longitudinal spherical aberration is characterized by a wave-front aberration equation;

$$W(\rho) = \sum_{n=4,6,8,\ldots} \left(\frac{\Delta z}{4n(F\#)^2}\right)\left(-\frac{\Delta z}{f_0}\right)^{\frac{n-4}{2}} \rho^n$$

where, W(ρ) is the wave-front aberration, ρ is normalized pupil radius, $f_0$ is paraxial focal length, Δz is desired depth of focus, F# is F Number, n is the order of spherical wave-front aberration, n=4 is 3rd order spherical aberration, n=6 is 5th order spherical aberration and so on.

8. The optical imaging system of claim 7, wherein the specific longitudinal spherical aberration comprises major 3rd order longitudinal spherical aberration.

9. The optical imaging system of claim 8, wherein the values of high order spherical aberrations higher than the 3rd order spherical aberration are less than about 15 percent of that of the 3rd order spherical aberration.

10. An optical system with extended depth of focus, comprising:

an optical imaging module, having a specific longitudinal spherical aberration corresponding to the depth of focus for generating an image, wherein the specific longitudinal spherical aberration is characterized by a wave-front aberration equation;

$$W(\rho) = \sum_{n=4,6,8,\ldots} \left(\frac{\Delta z}{4n(F\#)^2}\right)\left(-\frac{\Delta z}{f_0}\right)^{\frac{n-4}{2}} \rho^n$$

where, W(ρ) is the wave-front aberration, ρ is normalized pupil radius, $f_0$ is paraxial focal length, Δz is desired depth of focus, F# is F Number, n is the order of spherical wave-front aberration, n=4 is $3^{rd}$ order spherical aberration, n=6 is $5^{th}$ order spherical aberration and so on.

11. The optical system of claim 10, wherein based on the specific longitudinal spherical aberration is defined as the specific longitudinal spherical aberration which causes the energy distribution of the point spread function corresponding to the optical system in the optical axis (z) to be more uniform than that of a diffraction limit-based optical imaging system and a Strehl ratio for the optical system to exceed a specific value when the specific longitudinal spherical aberration is defined within the specific range.

12. The optical system of claim 11, wherein the specific range of the specific longitudinal spherical aberration is between 0.25λ and 5λ.

13. The optical system of claim 11, wherein the energy distribution of the point spread function corresponding to the obtained image essentially has a defocus range of ±1.5λ and the Strehl ratio is in a range between 0.2 and 0.3.

14. The optical system of claim 10, wherein specific longitudinal spherical aberration of the optical imaging module comprises major $3^{rd}$ order longitudinal spherical aberration.

15. The optical system of claim 14, wherein the values of high order spherical aberrations higher than the 3rd order spherical aberration are less than about 15 percent of that of the 3rd order spherical aberration.

* * * * *